(12) United States Patent
Kim et al.

(10) Patent No.: US 12,735,124 B2
(45) Date of Patent: Sep. 15, 2026

(54) DIFFUSER APPARATUS

(71) Applicants: HYUNDAI MOTOR COMPANY, Seoul (KR); KIA CORPORATION, Seoul (KR)

(72) Inventors: Dong Ha Kim, Gwacheon-si (KR); Hong Heui Lee, Suwon-si (KR); Eun Soo Park, Busan (KR); Jin Young Yoon, Gimpo-si (KR); Hak Lim Kim, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 225 days.

(21) Appl. No.: 18/822,874

(22) Filed: Sep. 3, 2024

(65) Prior Publication Data

US 2025/0340252 A1 Nov. 6, 2025

(30) Foreign Application Priority Data

May 2, 2024 (KR) ........................ 10-2024-0058701

(51) Int. Cl.
*B62D 35/00* (2006.01)
*B62D 37/02* (2006.01)

(52) U.S. Cl.
CPC ........... *B62D 35/007* (2013.01); *B62D 37/02* (2013.01)

(58) Field of Classification Search
CPC .............................. B62D 35/007; B62D 37/02
See application file for complete search history.

(56) References Cited

U.S. PATENT DOCUMENTS

2023/0069094 A1* 3/2023 Moradnia ............ B62D 35/007

FOREIGN PATENT DOCUMENTS

KR 20150057811 A * 5/2015 ............. B62D 7/159

* cited by examiner

*Primary Examiner* — Dany E Akakpo
(74) *Attorney, Agent, or Firm* — MCDONNELL BOEHNEN HULBERT & BERGHOFF LLP

(57) ABSTRACT

In a diffuser apparatus, a plurality of diffusers are retracted in a lower part of a rear bumper and is deployed, and the operation of each of the diffusers is divided into a tilting operation and a sliding operation, so that airflow control is optimized for various situations such as driving conditions and driving environment, thereby improving driving stability and aerodynamic performance. In addition, the operation of the plurality of diffusers is controlled by a single driver, thereby simplifying the structure.

12 Claims, 9 Drawing Sheets

DIFFUSER APPARATUS

CROSS REFERENCE TO RELATED APPLICATIONS

This application claims priority to Korean Patent Application No. 10-2024-0058701, filed May 2, 2024, the entire contents of which are incorporated herein for all purposes by this reference.

BACKGROUND

Technical Field

The present disclosure relates to a diffuser apparatus configured to regulate airflow below a rear bumper.

Description of the Related Art

When a vehicle is traveling at high speed or cornering, a loss of traction in the rear tires may be detrimental to increasing the speed of travel and worsen the driving stability.

To solve this problem, air spoilers are mounted on the rear of the vehicle to change airflow passing through the vehicle. As a result, a pressure is created to push down on the vehicle depending on the airflow around the air spoiler, thereby improving the traction of the rear tires.

Such air spoilers are mounted on the rear of the vehicle, which limits the design freedom. Once the air spoiler is mounted, it is difficult to change the design. When the air spoiler is applied to high-end vehicles, the design is compromised by the mounting of the air spoiler.

As such, air spoilers are a limited technology for improving aerodynamic performance to improve the fuel efficiency and driving stability of vehicles. Additional aerodynamic performance improvements require changes in the shape of the vehicle or changes in the specification of the air spoiler.

Accordingly, a diffuser is additionally provided on the lower part of the rear bumper to improve aerodynamics.

However, the diffuser simply tilts down at the rear bumper, thereby limiting the aerodynamic performance improvements that may be achieved.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to provide a diffuser apparatus in which a diffuser is retracted in the lower part of the rear bumper and is deployed downward when in use, and the deploying operation is divided into a tilting operation and a sliding operation, so that airflow control may be optimized for various situations such as driving conditions and driving environment, thereby improving driving stability and aerodynamic performance.

In order to achieve at least one of the above objectives, according to one aspect of the present disclosure, there is provided a diffuser apparatus including a driver including a motor and a drive shaft and configured to transmit driving force, a gear unit connected to the drive shaft of the driver and configured to rotate by receiving power, a first diffuser rotatably connected to a fixed bracket and configured to be deployed or retracted by rotating in concert with rotation of the gear unit; a second diffuser configured to slide from the first diffuser to be deployed or retracted and including a rail, a first connector rotatably connected to the gear unit, and a second connector provided on the first diffuser and connected to the rail of the second diffuser, wherein in response to movement of the first diffuser to a deployed position, the second connector is configured to move the rail in concert with the first connector so that the second diffuser slides.

The fixed bracket may be fixed to a rear bumper or a bumper back beam. The first diffuser may be tilted from a lower part of the rear bumper, and the second diffuser may be deployed backward from the first diffuser.

The gear unit may include a sun gear connected to the drive shaft, a plurality of satellite gears arranged around the sun gear and spaced apart from each other, a ring gear inwardly engaged with the satellite gears, and a carrier configured to rotate together with the satellite gears.

The carrier may have a first end connected to the satellite gears and a second end extending outwardly from the ring gear from a center where branches of the first end converge, with a carrier gear being provided on the second end to engage with the first connector.

The first diffuser may include an interlocking portion extended to engage with an outer surface of the ring gear, the interlocking portion being fan-shaped and configured to rotate in concert with rotation of the ring gear to change a rotational position of the first diffuser.

The fixed bracket may include a brake portion protruding toward a side of the ring gear. The ring gear may include a catch portion protruding toward the brake portion, the catch portion being positioned to contact the brake portion during rotation of the first diffuser to the deployed position as the ring gear is rotated.

The catch portion of the ring gear may include a plurality of catch portions, among which a first catch portion is positioned to contact the brake portion when the first diffuser is in an initial position, and a second catch portion is positioned to contact the brake portion when the first diffuser is rotated to the deployed position.

The gear unit may be configured such that when the driver is operated, the satellite gears are moved by rotation of the sun gear to rotate the ring gear, and when the catch portion of the ring gear is contacted and held by the brake portion, the satellite gears are rotated and moved.

The second connector may be configured to be positioned to be spaced apart from the first connector in an initial position of the first diffuser and to engage with the first connector when the first diffuser is rotated to the deployed position.

The carrier may include a carrier gear. The first connector may be provided under and engaged with the carrier gear. The second connector may be located between a center of rotation of the first diffuser and the first connector.

The rail of the second diffuser may include a rack gear extending in a straight line.

The fixed bracket may include a mounting end configured such that the first connector is rotatably mounted thereon, and the first diffuser may include a connection end configured such that the second connector is rotatably mounted thereon.

In the diffuser apparatus having the above-described structure, a plurality of diffusers are retracted in the lower part of the rear bumper and is deployed, and the operation of each of the diffusers is divided into a tilting operation and a sliding operation, so that airflow control may be optimized for various situations such as driving conditions and driving environment, thereby improving driving stability and aerodynamic performance.

In addition, the operation of the plurality of diffusers may be controlled by a single driver, thereby enabling structure simplification.

BRIEF DESCRIPTION OF THE FIGURES

The above and other objectives, features, and other advantages of the present disclosure will be more clearly understood from the following detailed description when taken in conjunction with the accompanying drawings, in which:

FIG. 3 illustrates the first diffuser and the second diffuser in deployed positions in the diffuser apparatus according to an exemplary embodiment of the present disclosure;

DETAILED DESCRIPTION

Figure 1:
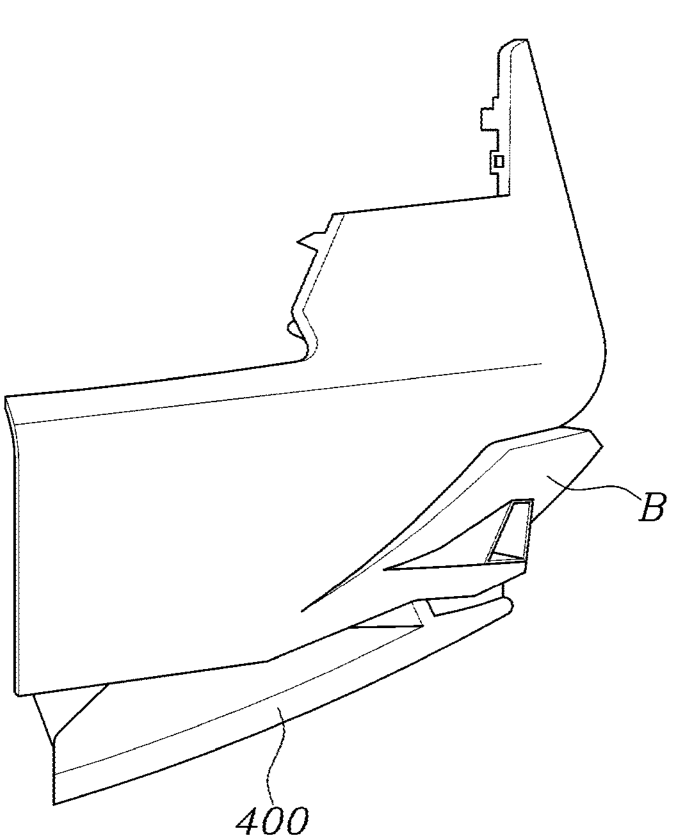
FIG. 1 illustrates a diffuser apparatus according to an exemplary embodiment of the present disclosure in a retracted position.

Hereinafter, embodiments disclosed in the present disclosure will be described in detail with reference to the accompanying drawings, in which identical or similar constituent elements are given the same reference numerals regardless of the reference numerals of the drawings, and a repeated description thereof will be omitted.

Terms "module" and "part" used in the following description are given or mixed together only for ease of writing the specification, and have no meanings or roles distinct from each other.

In the description of the present disclosure, when it is determined that the detailed description of the related art would obscure the gist of the present disclosure, the detailed description thereof will be omitted. In addition, the attached drawings are merely intended to be able to readily understand the embodiments disclosed herein, and thus the technical idea disclosed herein is not limited by the attached drawings, and it should be understood to include all changes, equivalents, and substitutions included in the idea and technical scope of the present disclosure.

It will be understood that, although terms "first", "second", etc., may be used herein to describe various elements, these elements should not be limited by these terms. These terms are only used to distinguish one element from another element.

It will be understood that when an element is referred to as being "coupled", "connected", or "linked" to another element, it can be directly coupled or connected to the other element or intervening elements may be present therebetween. In contrast, it should be understood that when an element is referred to as being "directly coupled", "directly connected", or "directly linked" to another element, there are no intervening elements present.

As used herein, the singular forms "a", "an", and "the" are intended to include the plural forms as well, unless the context clearly indicates otherwise.

It will be further understood that the terms "comprise", "include", "have", etc. when used in the specification, specify the presence of stated features, numbers, steps, operations, elements, components, and/or combinations thereof but do not preclude the presence or addition of one or more other features, numbers, steps, operations, elements, components, and/or combinations thereof.

A term "controller" may include a communication device communicating with another controller or a sensor in order to control a function which the controller manages, a memory storing an operating system, logic instructions, input/output information, and the like, and one or more processors performing determination, calculation, decision, and the like necessary for controlling the function.

Hereinafter, a diffuser apparatus according to exemplary embodiments of the present disclosure will be described in detail with reference to the accompanying drawings.

As shown in FIGS. 1 to 9, the diffuser apparatus according to the present disclosure includes a driver 100 including a motor 110 and a drive shaft 120 and configured to transmit driving force; a gear unit 200 connected to the drive shaft 120 of the driver 100 and configured to rotate by receiving power, a first diffuser 400 rotatably connected to a fixed bracket 300 and configured to be deployed or retracted by rotating in concert with rotation of the gear unit 200, a second diffuser 500 configured to slide from the first diffuser 400 to be deployed or retracted and including a rail 510, a first connector 600 rotatably connected to the gear unit 200, and a second connector 700 provided on the first diffuser 400 and connected to the rail 510 of the second diffuser 500. In response to movement of the first diffuser 400 to a deployed position, the second connector 700 moves the rail 510 in cooperation with the first connector 600 so that the second diffuser 500 slides.

The present disclosure is configured to regulate airflow below the rear part of a vehicle, in which the fixed bracket 300 may be fixed to a rear bumper or a bumper back beam B.

Figure 2:
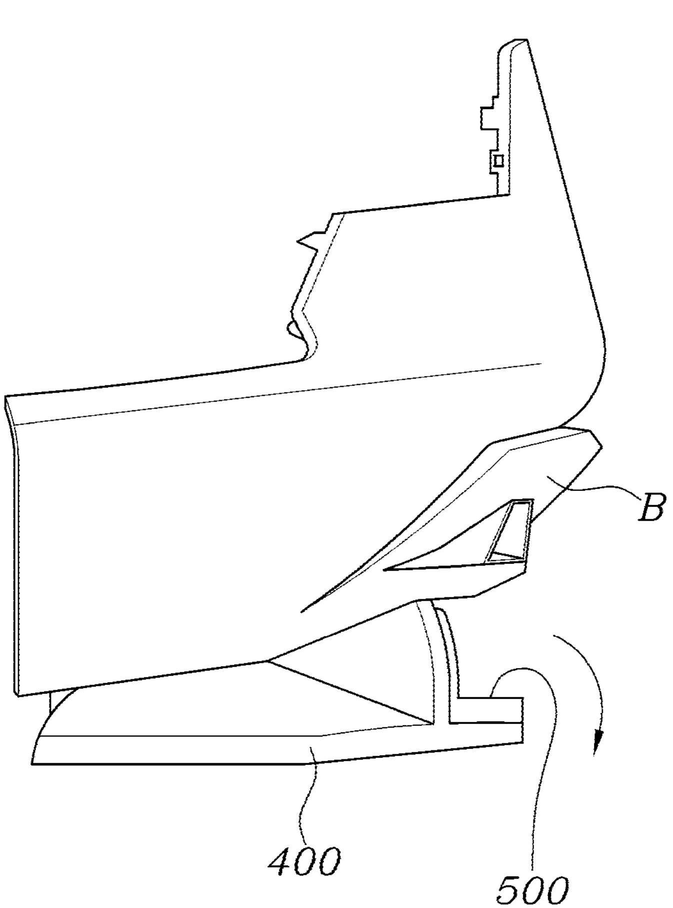
FIG. 2 illustrates the first diffuser in a deployed position in the diffuser apparatus according to an exemplary embodiment of the present disclosure.
Figure 3:
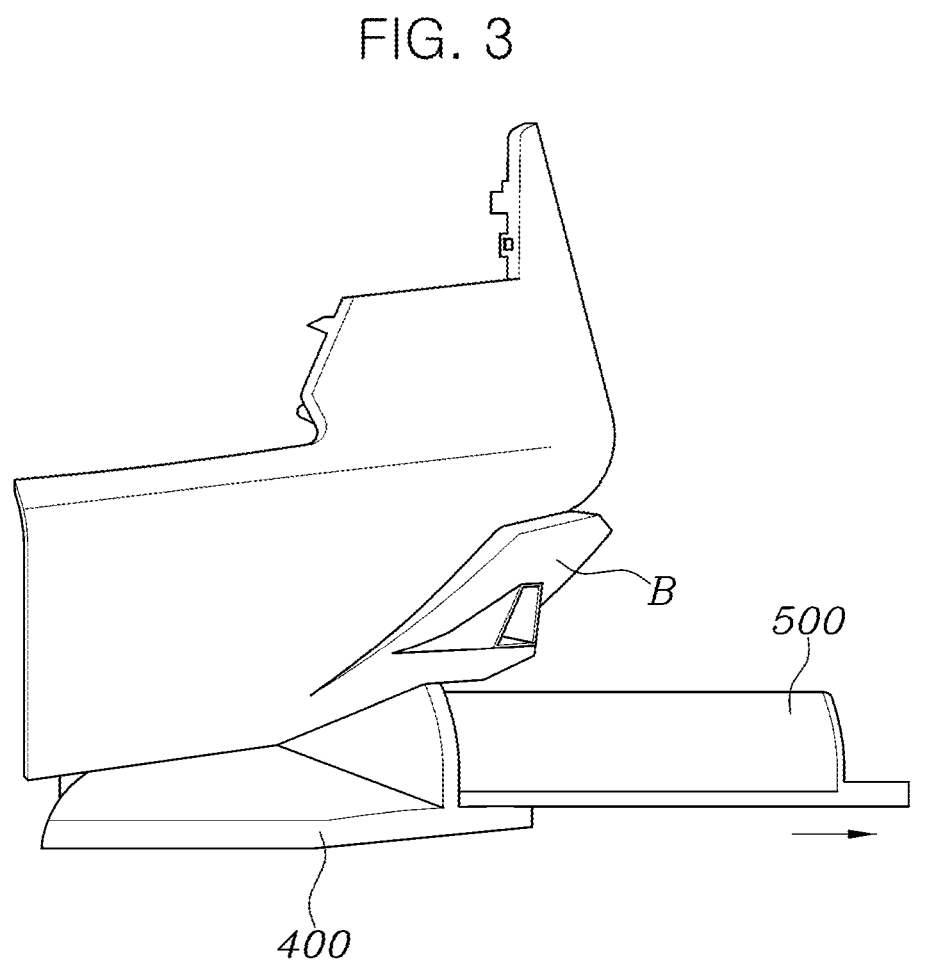

FIG. 1 illustrates the first diffuser 400 and the second diffuser 500 in retracted positions, FIG. 2 illustrates the first diffuser 400 tilted from the lower part of the rear bumper, and FIG. 3 illustrates the second diffuser 500 deployed backward from the first diffuser 400. In this manner, the airflow under the vehicle may be variously regulated during travel by the deploying operation of the first diffuser 400 and the second diffuser 500.

In particular, in the present disclosure, the gear unit 200 includes a sun gear 210 connected to the drive shaft 120 and rotating under power received from the driver 100, a plurality of satellite gears 220 arranged around the sun gear 210 and spaced apart from each other, a ring gear 230 inwardly engaged with the satellite gears 220, and a carrier 240 rotating together with the satellite gears 220.

Accordingly, during power transmission by the driver 100, the first diffuser 400 and the second diffuser 500 are deployed or retracted by selective engagement of the first connector 600 and the second connector 700 with the respective gears comprising the gear unit 200.

As more particularly described in the present disclosure, the driver 100 may include the motor 110 and the drive shaft 120. The drive shaft 120 is coupled to the sun gear 210 to cause the sun gear 210 to rotate under the power of the motor 110. For the motor 110, the operation of the motor 110 is determined by the control of a controller.

The gear unit 200 includes the sun gear 210, the satellite gears 220, the ring gear 230, and the carrier 240. The sun gear 210 is located at the center of the ring gear 230, the sun gear 210 and the ring gear 230 are connected by the satellite gears 220, and the satellite gears 220 are configured for simultaneous rotational movement by the carrier 240. The sun gear 210, the satellite gears 220, and the ring gear 230 are configured to interlock with each other by gear teeth, and the carrier 240 is rotatably connected to the shafts of the satellite gears 220.

The present disclosure is to separate the operation of the first diffuser 400 and the operation of the second diffuser 500 by the gear unit 200, in which the first diffuser 400 and the second diffuser 500 are operated by the single driver 100.

The first diffuser 400 is rotatably disposed on the fixed bracket 300. The first diffuser 400 may be provided on the underside of the fixed bracket 300, and may have a center point of rotation on the rear bumper, the bumper back beam, or the fixed bracket 300.

Further, the first diffuser 400 is configured to rotate in concert with the rotation of the ring gear 230.

Accordingly, the first diffuser 400 has an interlocking portion 410 extending to engage with an outer surface of the ring gear 230. The interlocking portion 410 is fan-shaped and configured to rotate in concert with the rotation of the ring gear 230 to change the rotational position of the first diffuser 400.

In other words, gear teeth are provided on the outer surface of the ring gear 230 and gear teeth are provided on the arc of the interlocking portion 410 such that the ring gear 230 and the interlocking portion 410 engage. Accordingly, when the ring gear 230 is rotated, the interlocking portion 410 may be rotated in concert with the rotation of the ring gear 230, so that the first diffuser 400 may be tilted to start the deploying or retracting operation.

The second diffuser 500 is provided to be slidable with respect to the first diffuser 400. That is, the second diffuser 500 may be provided below the first diffuser 400 and may slide with respect to the first diffuser 400 to perform the deploying or retracting operation. The second diffuser 500 may be slidably mounted on the first diffuser 400 using a variety of structures, such as a groove/protrusion structure or a rail structure.

The second diffuser 500 includes the rail 510, which is engaged with the second connector 700. Accordingly, the sliding operation of the second diffuser 500 may be performed depending on whether the second connector 700 rotates or not. Here, the rail 510 of the second diffuser 500 may be implemented as a rack gear extending in a straight line. In this manner, the rail 510 may be moved in a straight line during rotation of the second connector 700, so that the second diffuser 500 may slide.

The second connector 700 may be rotated in concert with the rotation of the carrier 240, and whether the second connector 700 is rotated or not may be determined by the rotational position of the first diffuser 400.

That is, the fixed bracket 300 is provided with the first connector 600 rotatably connected to the carrier 240, and the first diffuser 400 is provided with the second connector 700 engaged with the rail 510 of the second diffuser 500.

Here, the fixed bracket 300 may have a mounting end 320 configured such that the first connector 600 is rotatably mounted thereon, and the mounting end 320 may be shaped to extend toward a carrier gear 241. Further, the first diffuser 400 may have a connection end 420 configured such that the second connector 700 is rotatably mounted thereon. The connection end 420 is spaced apart from the mounting end 320 to space the second connector 700 apart from the first connector 600.

The carrier 240 has a first end connected to the respective satellite gears 220 and a second end extending outwardly from the ring gear 230 from a center where branches of the first end converge. The carrier gear 241 is provided on the second end to engage with the first connector 600. Accordingly, rotation of the carrier 240 may rotate the first connector 600.

Figure 4:
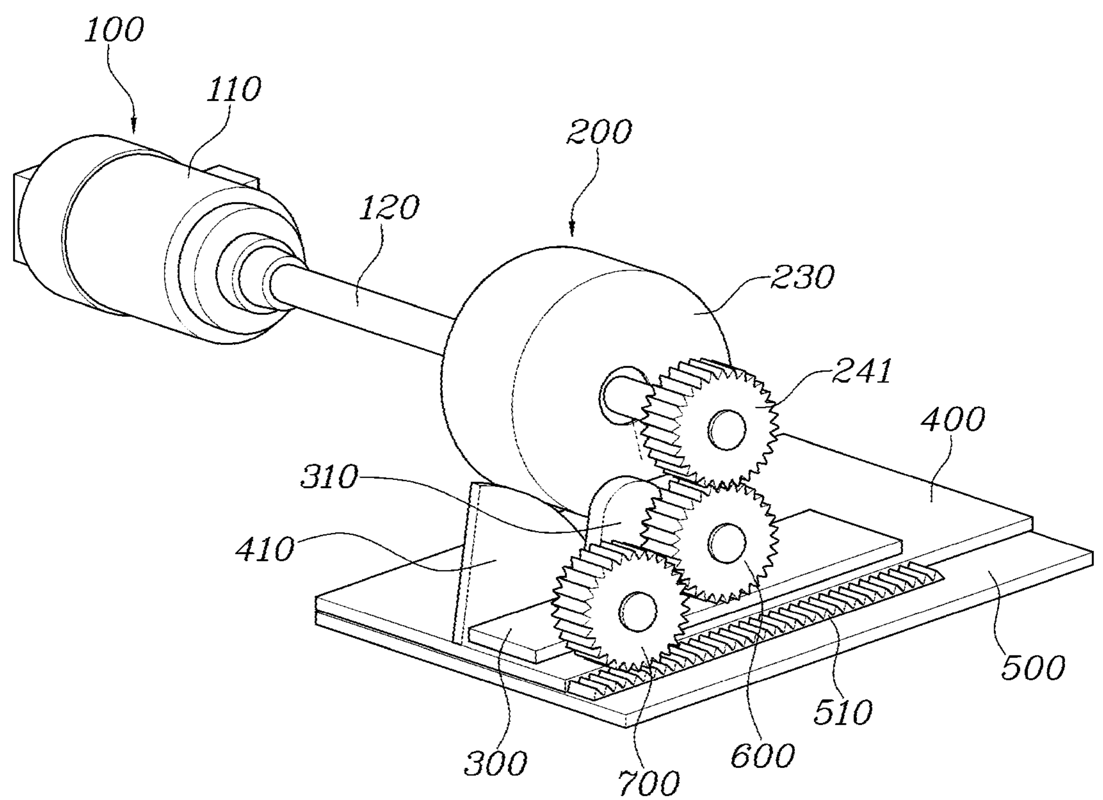
FIG. 4 illustrates the driver and the gear unit of the diffuser apparatus according to an exemplary embodiment of the present disclosure.
Figure 5:
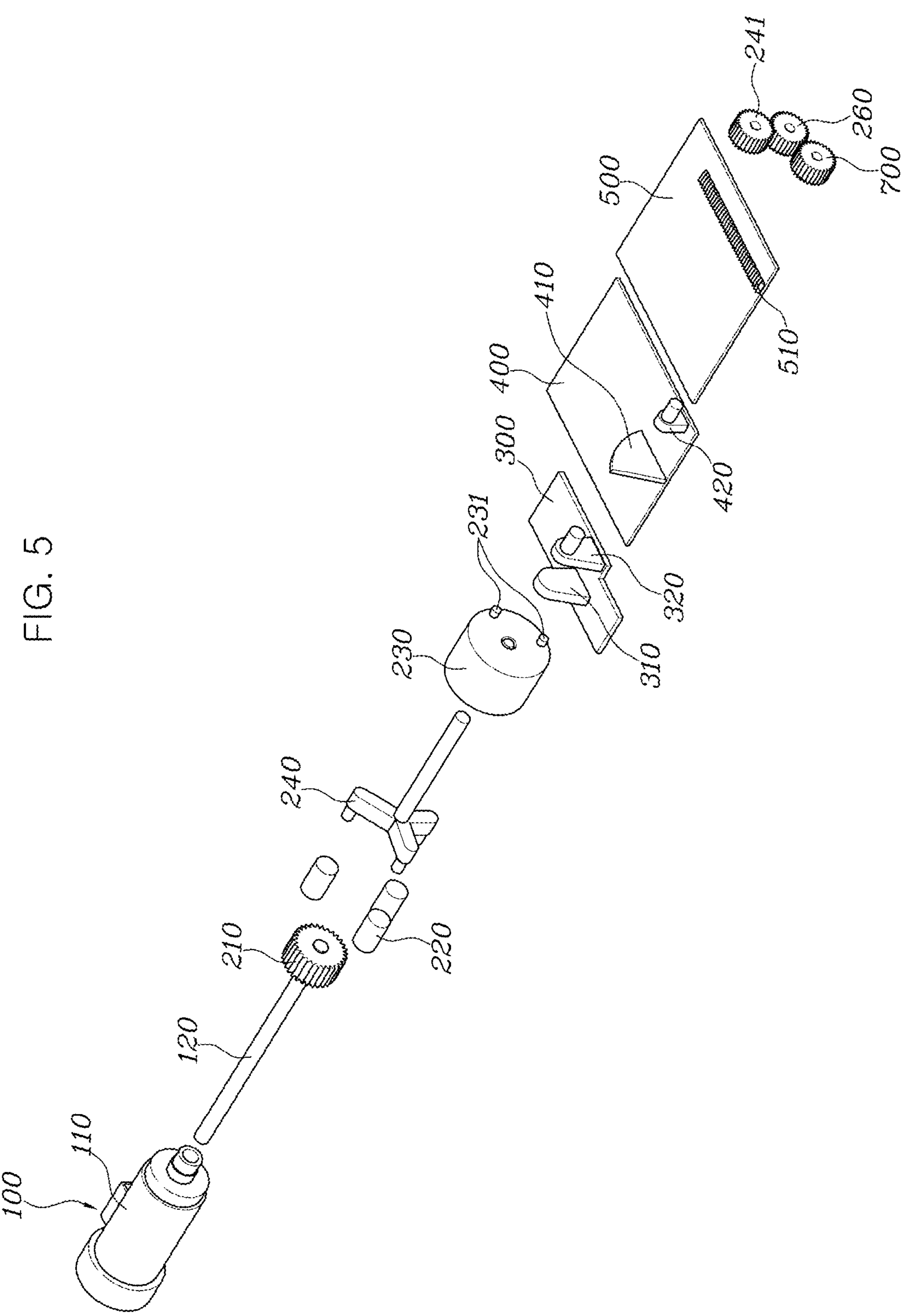
FIG. 5 is an assembly view of the diffuser apparatus according to an exemplary embodiment of the present disclosure.

Referring to FIGS. 4 and 5, in the carrier 240, the first end is forked into the branches connected to the respective shafts of the satellite gears 220, and the second end extends from the center where the branches of the first end converge, such that the carrier gear 241 may be provided outside the ring gear 230. The carrier gear 241 may be engaged with the first connector 600, such that the first connector 600 may rotate in concert with the rotation of the carrier 240.

In particular, in the present disclosure, the first diffuser 400 may be tilted in concert with the rotation of the ring gear 230 so as to be deployed or retracted, and the second connector 700 may be moved together with the first diffuser 400 as the first diffuser 400 moves to the deployed position so as to engage with the first connector 600.

In this manner, in response to movement of the first diffuser 400 to the deployed position, the second connector 700 may be engaged with the first connector 600 and rotate in concert with the first connector 600, thereby moving the rail 510 of the second diffuser 500 to slide the second diffuser 500.

As described above, in the present disclosure, the tilting operation of the first diffuser 400 and the sliding operation of the second diffuser 500 may be performed by the single driver 100. The sliding operation of the second diffuser 500 may be performed after the first diffuser 400 is tilted and deployed. Accordingly, operating errors may be prevented, and optimized control of aerodynamic performance may be performed by stepwise airflow regulation.

Specifically, the fixed bracket 300 has a brake portion 310 protruding toward a side of the ring gear 230. The ring gear 230 has a catch portion 231 protruding toward the brake portion 310. The catch portion 231 may be positioned to contact the brake portion 310 during rotation of the first diffuser 400 to the deployed position as the ring gear 230 is rotated.

Figure 6:
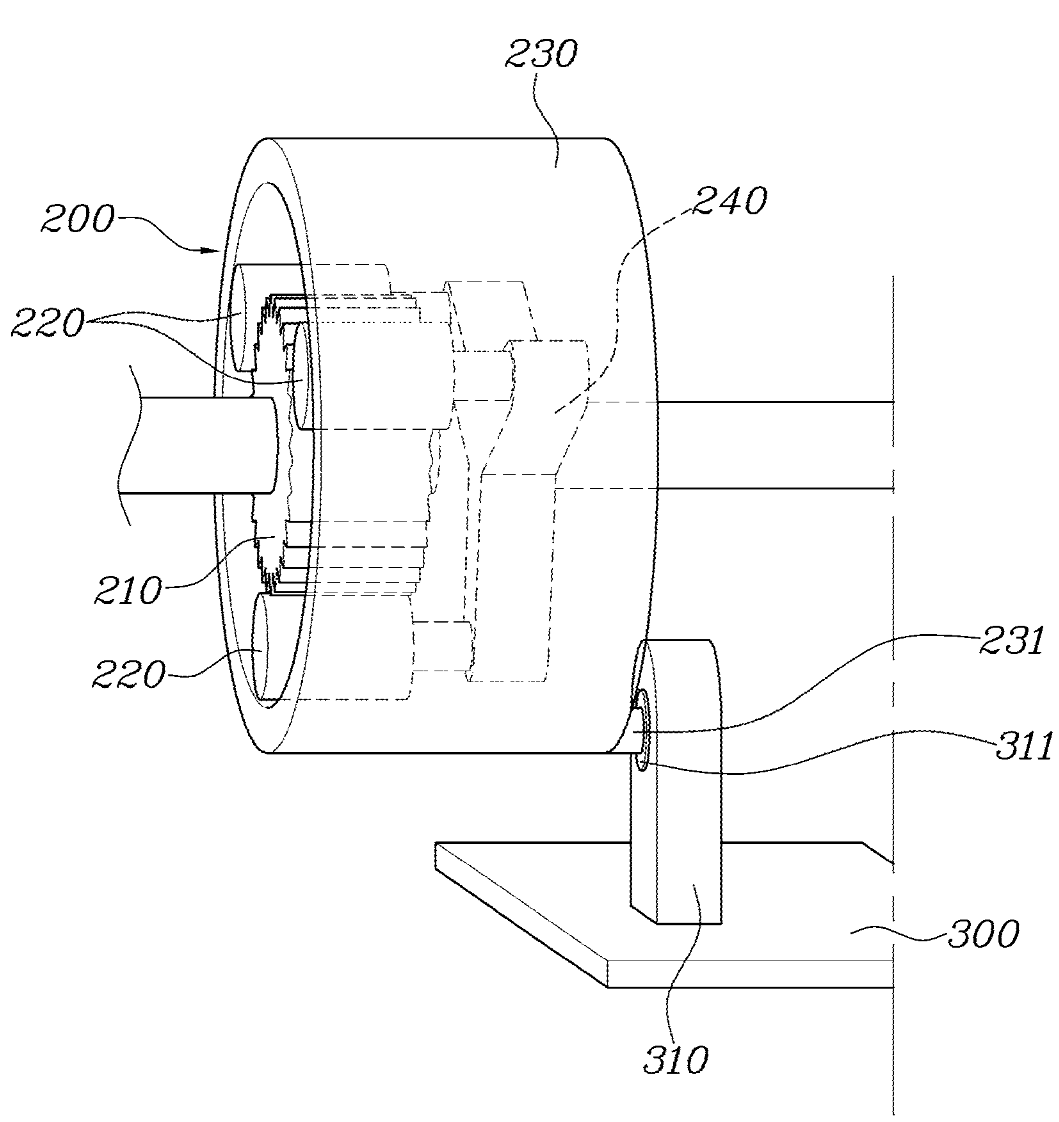
FIG. 6 illustrates the gear unit of the diffuser apparatus according to an exemplary embodiment of the present disclosure.

As shown in FIGS. 5 and 6, the brake portion 310 is provided on the fixed bracket 300, and the catch portion 231 is provided on the ring gear 230 to contact the brake portion 310 according to the rotational position. The brake portion 310 is provided with a catch recess 311 into which the catch portion 231 is inserted, thereby enabling the catch portion 231 to be accurately fixed in position.

In addition, the ring gear 230 may include a plurality of catch portions 231.

Among the plurality of catch portions 231, one catch portion 231 may be positioned to contact the brake portion 310 when the first diffuser 400 is in the initial position, and another catch portion 231 may be positioned to contact the brake portion 310 when the first diffuser 400 is tilted to the deployed position.

In this manner, a plurality of catch portions 231 are provided and arranged around the ring gear 230 so as to be spaced apart from each other.

Here, since one catch portion 231 is positioned to contact the brake portion 310 when the first diffuser 400 is tilted to the initial position, i.e., the retracted position, when the corresponding catch portion 231 contacts the brake portion 310, the first diffuser 400 may remain in the retracted position.

In addition, since the other catch portion 231 may be positioned to contact the brake portion 310 when the first diffuser 400 is tilted to the deployed position, when the corresponding catch portion 231 contacts the brake portion 310, the second diffuser 500 may remain in the deployed position.

The brake portion 310 may extend from the fixed bracket 300 adjacently to an outer surface of the ring gear 230, and each of the catch portions 231 may be configured to protrude from the ring gear 230 to catch the brake portion 310.

In this manner, the first diffuser 400 may be tilted in concert with the rotation of the ring gear 230, and when the rotation of the ring gear 230 is restrained by the catch portion 231 of the ring gear 230 being caught by the brake portion 310 of the fixed bracket 300, the tilting operation of the first diffuser 400 may also be restrained to maintain the retracted or deployed position.

As described above, the tilting operation of the first diffuser 400 may be performed only to a position in where the rotation of the catch portion 231 of the ring gear 230 is restrained by the brake portion 310, and the sliding operation of the second diffuser 500 may be performed thereafter as the rotational operations of the satellite gears 220 and the carrier 240 are maintained in a state where the ring gear 230 is prevented from rotating.

In addition, describing the operation of the gear unit 200, when the driver 100 is operated, the satellite gears 220 may be moved by rotation of the sun gear 210 to rotate the ring gear 230, and when the catch portion 231 of the ring gear 230 is contacted and held by the brake portion 310, the satellite gears 220 may be rotated and moved.

Figure 7:
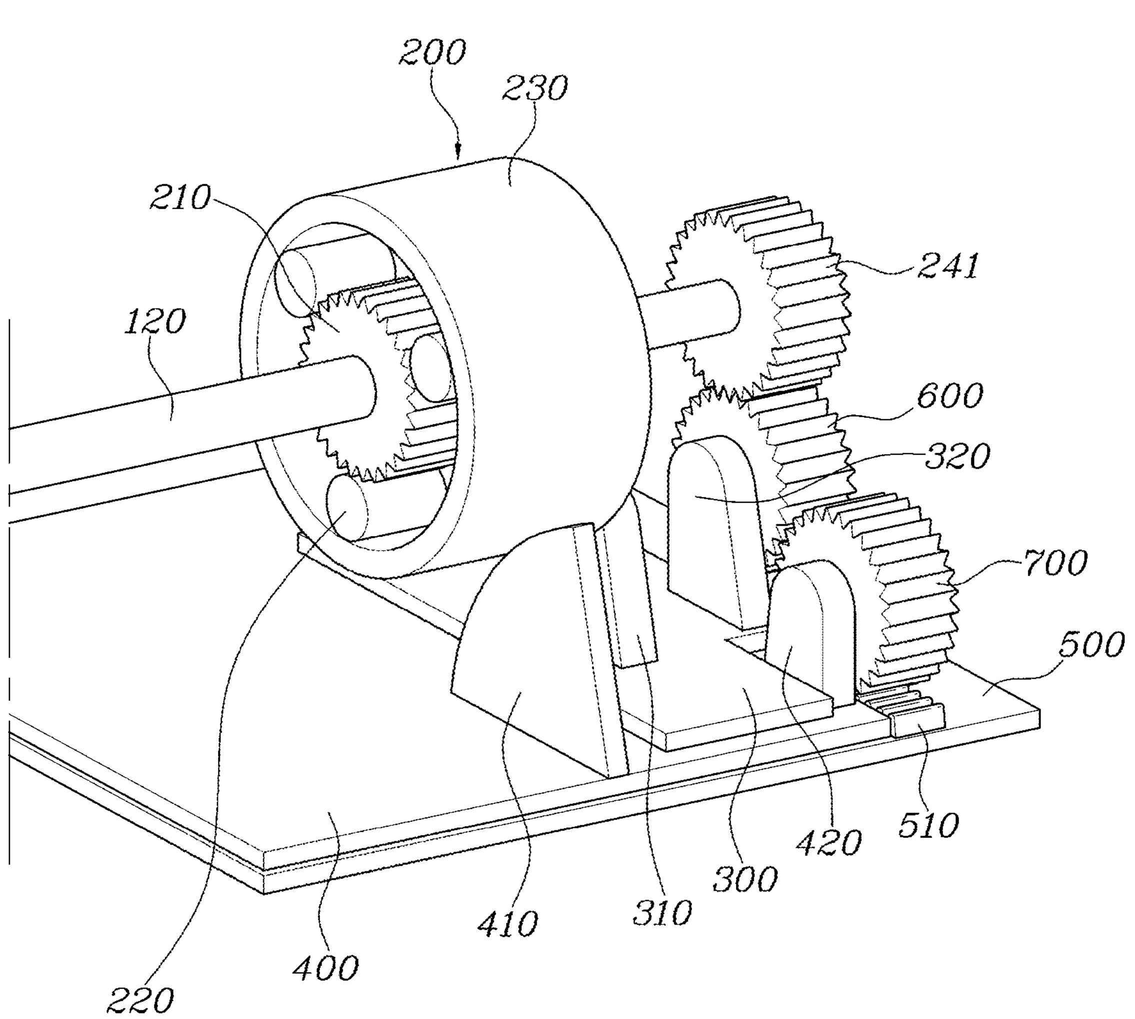
FIG. 7 illustrates connections between the gear unit, the first connector, and the second connector in the diffuser apparatus according to an exemplary embodiment of the present disclosure.

Referring to FIG. 7, the gear unit 200 has the satellite gears 220 disposed between the sun gear 210 and the ring gear 230, and when the sun gear 210 is rotated without being held, the satellite gears 220 are moved to rotate the ring gear 230. Accordingly, a tilting operation of the first diffuser 400 may be performed by the rotation of the ring gear 230.

Here, when the catch portion 231 of the ring gear 230 is contacted and held by the brake portion 310, the ring gear 230 remains in a non-rotated position, and the satellite gears 220 are rotated in concert with the rotation of the sun gear 210 to move along the circumference of the ring gear 230. Accordingly, the tilting operation of the first diffuser 400 is not performed as the rotation of the ring gear 230 is restrained, and the sliding operation of the second diffuser 500 may be performed as the second connector 700 is connected to the carrier 240 to work in concert with the rotation of the carrier 240, as described below.

Figure 8:
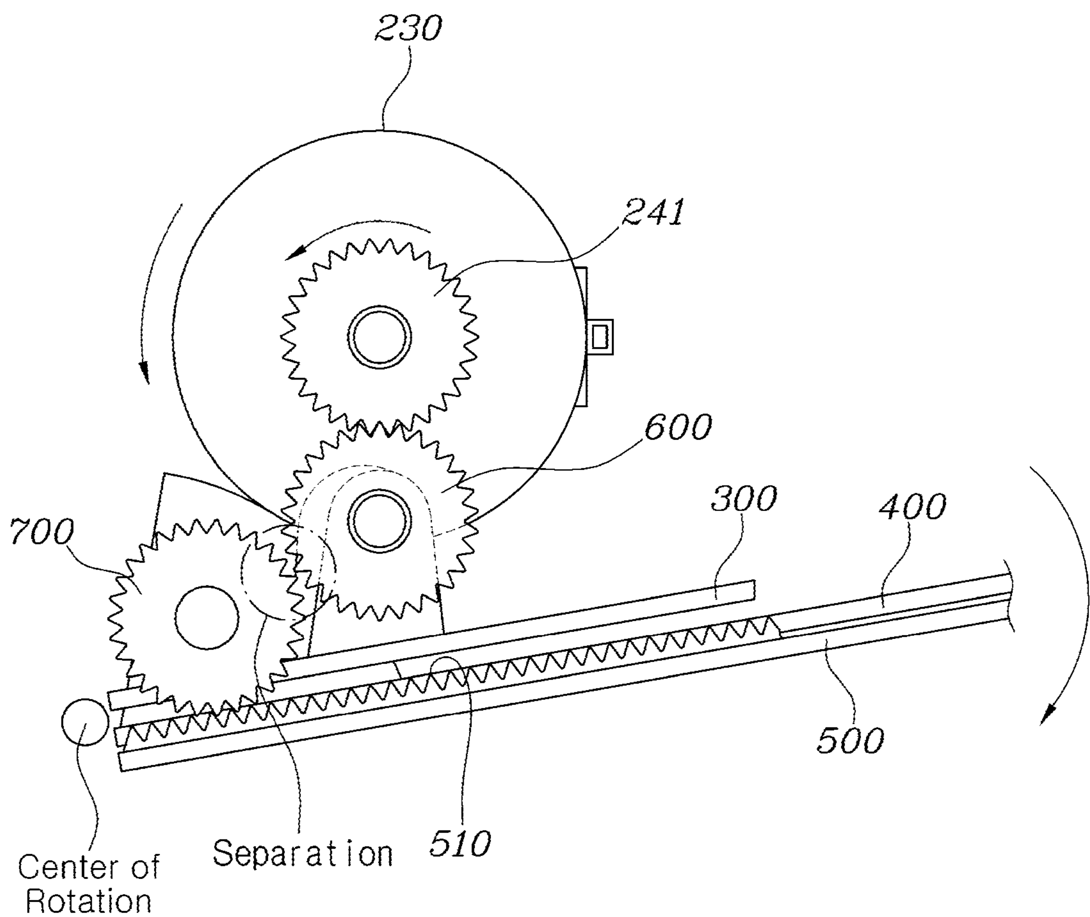
FIG. 8 illustrates the states of the gear unit, the first connector, and the second connector in response to the deployment of the first diffuser in the diffuser apparatus according to an exemplary embodiment of the present disclosure.
Figure 9:
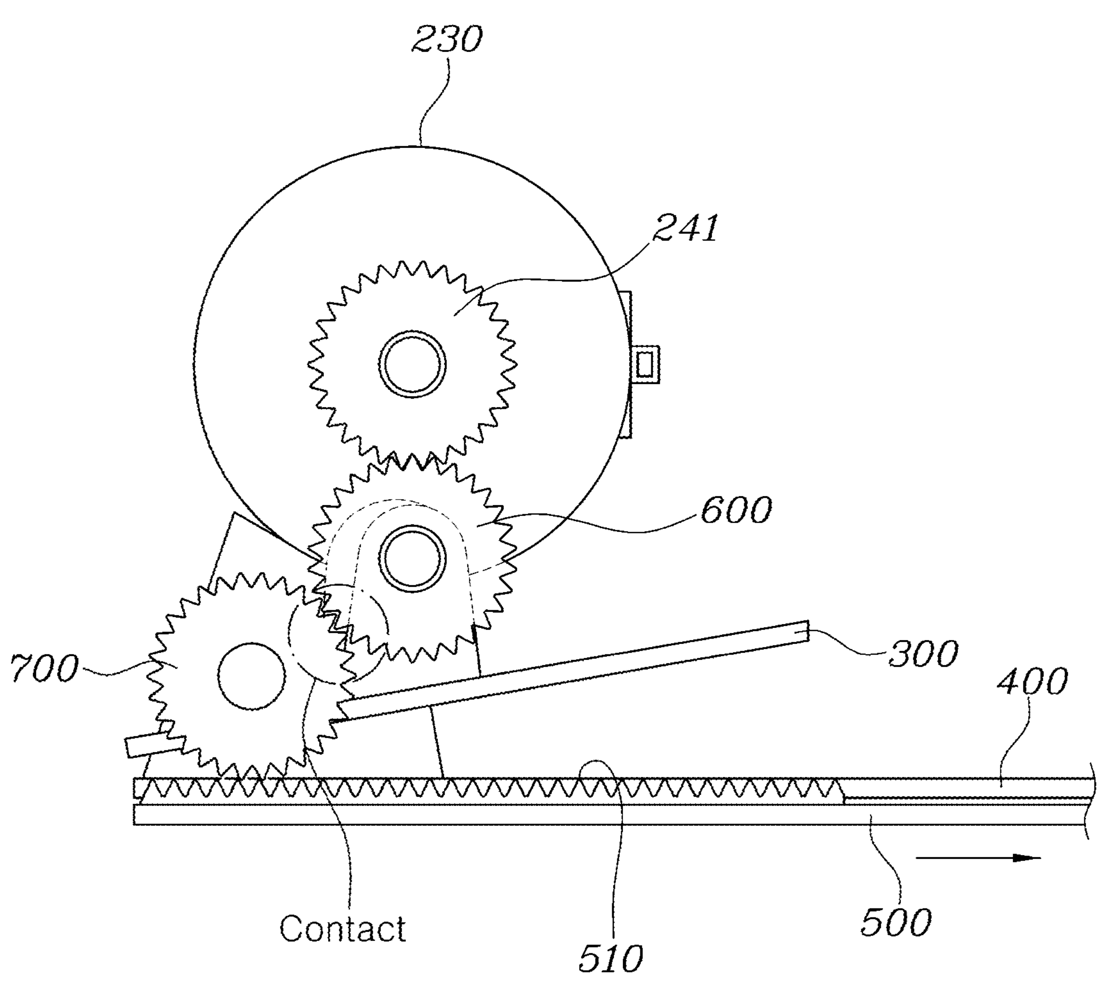
FIG. 9 illustrates the states of the gear unit, the first connector, and the second connector in response to the deployment of the second diffuser in the diffuser apparatus according to an exemplary embodiment of the present disclosure.

Specifically, as shown in FIGS. 7 to 9, the second connector 700 may be configured to be positioned to be spaced apart from the first connector 600 in the initial position of the first diffuser 400 and to engage with the first connector 600 when the first diffuser 400 is rotated to the deployed position.

The second connector 700 is mounted on the first diffuser 400. In the initial position in where the first diffuser 400 is retracted, the second connector 700 is spaced apart from and not contacted by the first connector 600, thereby causing the position of the rail 510 engaged with the second connector 700 to be fixed. When engaging with the first connector 600 in response to tilting of the first diffuser 400 to the deployed position, the second connector 700 is rotated in concert with the rotation of the first connector 600 to move the rail 510.

That is, the carrier 240 is provided with the carrier gear 241, the first connector 600 is provided under and engaged with the carrier gear 241, and the second connector 700 is located between the center of rotation of the first diffuser 400 and the first connector 600.

Accordingly, the first connector 600 engaged with the carrier gear 241 is always rotated when the driver 100 is operated, and the second connector 700 is positioned between the center point of rotation of the first diffuser 400 and the first connector 600 so as to be spaced apart from the first connector 600, so that the second diffuser 500 may be maintained retracted in the retracted position of the first diffuser 400, i.e., the initial position.

Accordingly, the diffuser apparatus of the present disclosure may realize the respective operations according to the following mechanism.

In the diffuser apparatus according to the present disclosure, the tilting operation of the first diffuser 400 is performed followed by the sliding operation of the second diffuser 500.

When the driver 100 is operated, the sun gear 210 is rotated, and the satellite gears 220 and the ring gear 230 engaged with the sun gear 210 are rotated.

Here, referring to FIG. 8, the ring gear 230 is engaged with the interlocking portion 410 of the first diffuser 400 so that the rotation of the ring gear 230 may be in concert with the rotation of the first diffuser 400 so that the first diffuser 400 may be tilted.

At this time, the first connector 600 provided on the fixed bracket 300 is connected to the carrier 240, which rotates with the satellite gears 220, but the second connector 700 provided on the first diffuser 400 is positioned to be spaced apart from the first connector 600, so that the second diffuser 500 is maintained retracted.

In addition, as shown in FIG. 9, when the first diffuser 400 is tilted to the deployed position as the ring gear 230 is rotated, the catch portion 231 of the ring gear 230 contacts the brake portion 310 of the fixed bracket 300. Accordingly, the ring gear 230 is held, and as the rotation of the ring gear 230 is held, the first diffuser 400 is fixed in the deployed position.

At the same time, as the first diffuser 400 is moved to the deployed position, the second connector 700 provided on the first diffuser 400 is engaged with the first connector 600, and the second connector 700 is rotated in concert with the rotation of the first connector 600, thereby transmitting rotational power to the rail 510 engaged with the second connector 700. Accordingly, the rail 510 is moved in a straight line, allowing the second diffuser 500 to slide.

As described above, in the present disclosure, the positions of the first diffuser 400 and the second diffuser 500 may be switched by the single driver 100, and stabilization may be achieved by sequentially operating the first diffuser 400 and the second diffuser 500.

Although the certain embodiments of the present disclosure have been described for illustrative purposes, those skilled in the art will appreciate that various modifications, additions, and substitutions are possible, without departing from the scope and spirit of the present disclosure as disclosed in the accompanying claims.

The invention claimed is:

1. A diffuser apparatus comprising:

a driver comprising a motor and a drive shaft, the driver being configured to transmit driving force;

a gear unit connected to the drive shaft of the driver, the gear unit being configured to rotate by receiving power;

a first diffuser rotatably connected to a fixed bracket, the first diffuser being configured to be deployed or retracted by rotating in concert with rotation of the gear unit;

a second diffuser configured to slide from the first diffuser to be deployed or retracted, wherein the second diffuser comprises a rail;

a first connector rotatably connected to the gear unit; and a second connector positioned on the first diffuser and connected to the rail of the second diffuser, wherein in response to movement of the first diffuser to a deployed position, the second connector is configured to move the rail in concert with the first connector to slide the second diffuser.

2. The diffuser apparatus of claim 1, wherein the fixed bracket is fixed to a rear bumper or a bumper back beam, and wherein the first diffuser is tilted from a lower part of the rear bumper, and the second diffuser is deployed backward from the first diffuser.

3. The diffuser apparatus of claim 1, wherein the gear unit comprises a sun gear connected to the drive shaft, a plurality of satellite gears arranged around the sun gear and spaced apart from each other, a ring gear inwardly engaged with the plurality of satellite gears, and a carrier configured to rotate together with the plurality of satellite gears.

4. The diffuser apparatus of claim 3, wherein the carrier has a first end connected to the satellite gears and a second end extending outwardly from the ring gear from a center where branches of the first end converge, with a carrier gear positioned on the second end to engage with the first connector.

5. The diffuser apparatus of claim 3, wherein the first diffuser comprises an interlocking portion extended to engage with an outer surface of the ring gear, the interlocking portion being fan-shaped and configured to rotate in concert with rotation of the ring gear to change a rotational position of the first diffuser.

6. The diffuser apparatus of claim 3, wherein the fixed bracket comprises a brake portion protruding toward a side of the ring gear, and wherein the ring gear comprises a catch portion protruding toward the brake portion, the catch portion being configured to contact the brake portion during rotation of the first diffuser to the deployed position as the ring gear is rotated.

7. The diffuser apparatus of claim 6, wherein the catch portion of the ring gear comprises a plurality of catch portions, wherein a first catch portion of the plurality of catch portions is configured to contact the brake portion when the first diffuser is in an initial position, and a second catch portion of the plurality of catch portions is configured to contact the brake portion when the first diffuser is rotated to the deployed position.

8. The diffuser apparatus of claim 6, wherein the gear unit is configured such that when the driver is operated, the plurality of satellite gears are moved by rotation of the sun gear to rotate the ring gear, and when the catch portion of the ring gear is contacted and held by the brake portion, the plurality of satellite gears are rotated and moved.

9. The diffuser apparatus of claim 6, wherein the second connector is positioned spaced apart from the first connector in an initial position of the first diffuser, and configured to engage with the first connector when the first diffuser is rotated to the deployed position.

10. The diffuser apparatus of claim 3, wherein the carrier comprises a carrier gear, the first connector is positioned under and engaged with the carrier gear, and the second connector is positioned between a center of rotation of the first diffuser and the first connector.

11. The diffuser apparatus of claim 1, wherein the rail of the second diffuser comprises a rack gear extending in a straight line.

12. The diffuser apparatus of claim 1, wherein the fixed bracket comprises a mounting end configured such that the first connector is rotatably mounted thereon, and the first diffuser comprises a connection end configured such that the second connector is rotatably mounted thereon.

* * * * *